United States Patent Office 3,582,411
Patented June 1, 1971

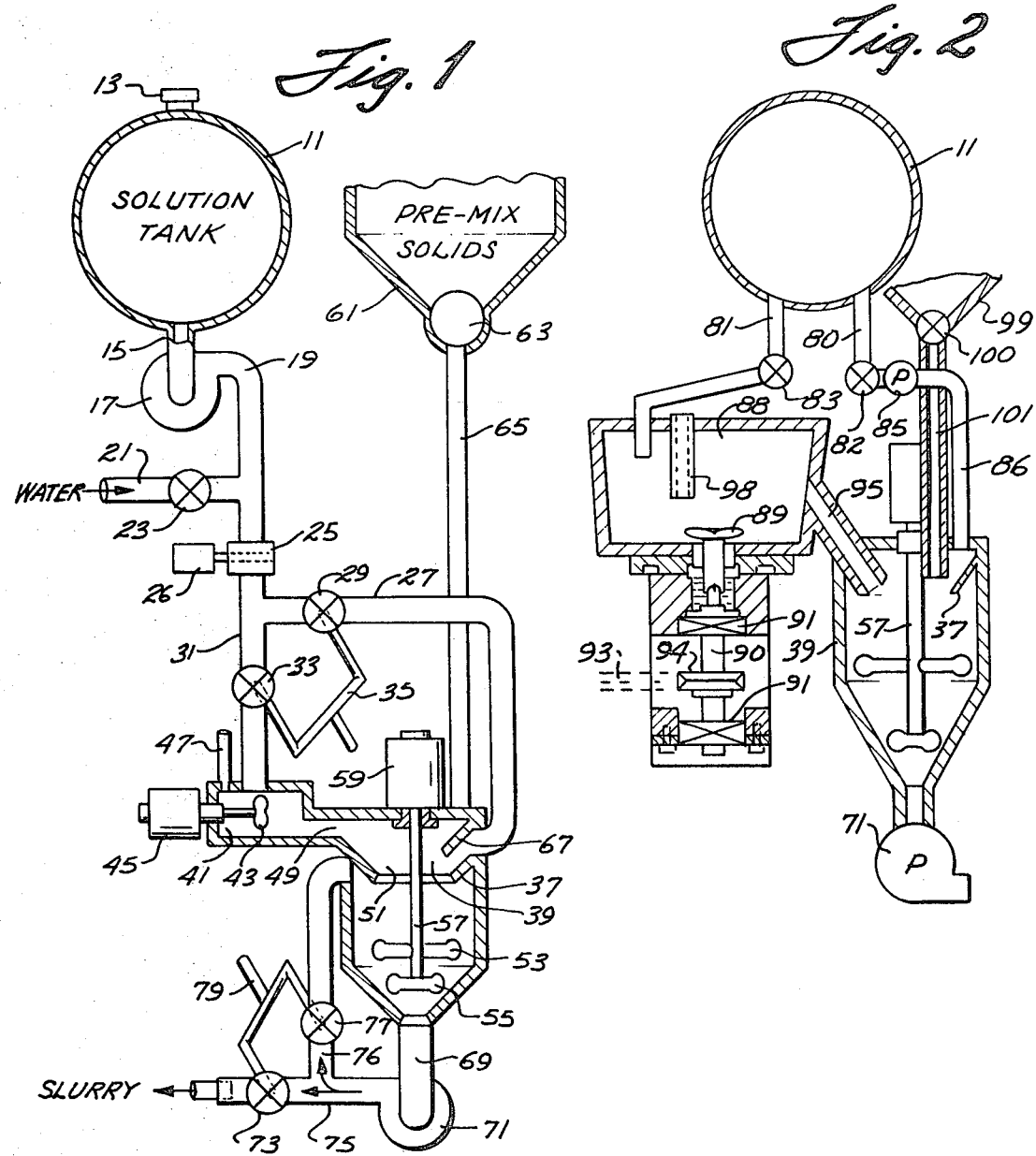

3,582,411
AERATED EXPLOSIVE SLURRY CONTAINING A FOAM PROMOTING AND VISCOSITY INCREASING AGENT AND METHOD OF MAKING SAME
Stephen M. Brockbank, 1960 East 4675 South, Salt Lake City, Utah 84117, and Robert B. Clay, Salt Lake City, Utah (827 West 3800 South, Bountiful, Utah 84010)
Filed Feb. 21, 1968, Ser. No. 707,238
Int. Cl. C06b 19/00
U.S. Cl. 149—2
15 Claims

ABSTRACT OF THE DISCLOSURE

A method and apparatus is disclosed for preparing a slurry of variable and controllable density from a liquid solution of oxidizer, such as ammonium nitrate sensitizing particulate material. The liquid component, or part thereof, is aerated prior to adding the particulate solids to vary density and explosive characteristics of the finished slurry. Part of the liquid may be diverted through a foaming or aerating device to incorporate fine gas bubbles and then combined with other liquid and with solid ingredients to make finished slurry. The relative proportions of the various components can be changed or programmed periodically.

BACKGROUND AND PRIOR ART

In U.S. Patent No. 3,303,738, issued to Clay et al. Feb. 14, 1967, an apparatus and method are disclosed and a process is claimed for mixing liquid and particulate solid components and pumping to a point of delivery the resulting slurry explosives. The slurry is a viscous fluid or gel-like blasting agent composition which when first produced can be pumped through a hose or other flow line directly into a borehole or can be filled into packages, if desired. This patent describes the process and means by which compositions of relatively low initial viscosity may be prepared and pumped, being so prepared or containing such appropriate ingredients that they can thicken further when they reach the borehole or package to prevent segregation of the suspended solid particulate ingredients from the suspending liquid. The apparatus and method described in the patent include means for carrying an ample supply of at least one liquid ingredient, which is usually an aqueous solution of strong oxidizer salts. Inorganic materials such as ammonoum nitrate, sodium nitrate, or the chlorates, perchlorates, of ammonia or of the alkali or alkaline earth metals, and/or mixtures of such, are usually predissolved in liquid, normally in water. The system also includes means for storing and feeding to a mixing station a supply of solid particulate ingredients, some at least of which are not soluble in the liquid, but can be blended and suspended therein as sensitizers and fuels, etc. Such solids may include one or more ingredients for thickening the slurry, to increase its viscosity and more fully prevent the gravitational segregation of ingredients as mentioned above. The thickened slurry has additional advantages of good resistance to water, which is frequently encountered in boreholes.

It is often desirable to be able to control the texture and density of the slurry. This has been done in the past by aerating the slurry, for example, during the mixing operation, or by incorporating gas in it after it is formed. Inclusion of air frequently occurs when the dry particulate solids are mixed into the liquid, as disclosed in an application of Melvin A Cook, Ser. No. 422,034, filed Dec. 29, 1964, now abandoned. It is possible in this way to include as much as 25% by volume of gas, or more, in the finished slurry; the density of the slurry is reduced in inverse proportion. This inclusion of gas not only changes the density per se but it also affects other properties, such as the sensitivity of the slurry to detonation by initiators, such as caps, boosters or other detonating devices.

The inclusion of a large number of very small bubbles of gas in the slurry is particularly advantageous for several reasons, as set forth, for example, in U.S. Patent No. 3,249,474 and also in an application of Clay, Ser. No. 488,803, filed Aug. 20, 1965, now abandoned. These very small and very numerous gas bubbles appear to afford active reaction centers which assist in propagating the detonation reaction. Thus they aid materially in sensitizing the slurry to promote its complete detonation.

Obviously, variations in density, such as those due to inclusion of various proportions of gas in any kind of bubbles, fine or coarse, also affect the strength or blasting power of the explosive. As the explosive is expanded in volume by inclusion of gas and its density is correspondingly decreased, one would naturally expect a reduction of blasting power. This often occurs. Under some circumstances, however, the decrease in power may not be as great as the decrease of density and, in some particular cases, it has been observed that in actual increase of explosive power may be obtained by carefully controlled aeration or incorporation of finely divided gas bubbles or "voids."

U.S. Patent No. 3,303,738, as mentioned above, describes various ways in which the composition of an explosive may be changed or varied, either from one batch to another or during production of a single or continuous batch. This arrangement is highly advantageous and has been very successful, commercially. The present invention has for its object a more convenient and more positive and accurate control of density by aeration or gas incorporation. The amount and kind of such aeration or foam promotion is readily and easily variable by the operator of the mixing and dispensing system of the present invention. According to the present invention, in particular, this may be done by suitable gas bubble incorporation into a selected part (or in some cases, all) of the liquid solution before the particulate solids are added thereto. By thus controlling the density, aeration or foaming of the whole composition, or of a part, the final sensitivity of it, may be closely controlled. Thus sensitivity and certain other characteristics of an explosive slurry can be adjusted as desired.

Density control does not require inclusion of detergents or surfactants of any kind. However, the use of small quantities of such, if desired, is contemplated and in fact is extremely useful in some cases and probably necessary in others.

One object of the invention is to facilitate the control of slurry density by controlled aeration of the liquid part of the composition, preferably before the slurry is made. Simple means or steps are employed by which some portion of the liquid, or all of it, if desired, may be suitably frothed, foamed or beaten in presence of air or some other insoluble gas, so as to include enough fine gas bubbles to effect the necessary result. This is a principal object of the present invention.

Another object is to incorporate ingredients in the composition at such steps in its preparation and of such properties as to promote and stabilize the foam or aeration.

A BRIEF DESCRIPTION OF THE DRAWINGS

FIG. 1 is an elevational view, partly diagrammatical, of one preferred mechanical embodiment of the present invention.

FIG. 2 is an elevational view of an alternative system for controlling the foaming or aeration of the liquid component, certain parts of the system being shown in section and other omitted for simplicity.

DESCRIPTION OF THE PREFERRED EMBODIMENT

Figure 3:
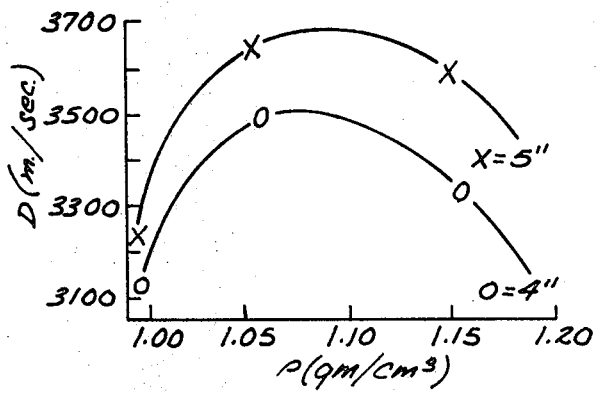
FIGS. 3, 4, 5 and 6 are graphs respectively of detonation velocity vs. density, density vs. pressure, critical diameter vs. density, and seismic strength vs. density of typical slurry explosives.

A general method of preparing slurry for use in boreholes to which the present invention has application is described in detail in U.S. Patent No. 3,303,738, mentioned above. Reference will be made first to FIG. 1 of the drawings. It will be understood that the apparatus of the present invention, now to be described in detail, is similar or equivalent in some respects to that described in the patent. Some of the general mechanical details, controls, etc., may appropriately be similar to those described in the patent, to the extent that they are not shown in detail or inherent in the system herein described. For this purpose, said patent is hereby incorporated by reference.

Referring now to FIG. 1, a supply of a liquid such as a concentrated or substantially saturated aqueous solution of ammonium nitrate, or of ammonium nitrate plus sodium nitrate, for example, or one or more of the other oxidizer salts commonly used in explosives, such as ammonium perchlorate or one or more of the ammonium or alkali metal or alkaline earth metal perchlorates, chlorates, or nitrates, or any suitable combination thereof, is contained in a tank 11. This tank has a filler cap 13 at the top and an outlet 15 at the bottom. A pump 17, preferably of metering or positive displacement type, is provided to force the fluid through a flow line 19, so as to obtain a steady flow which is independent of the elevation of the tank 11 or the extent to which it is filled. Any suitable pump that will serve to meter the fluid with a good degree of accuracy is satisfactory. Such pumps are well known on the market and one need not be described in detail here.

It is sometimes desirable to add additional liquid, e.g. warm or cold water, or an organic liquid fuel, etc., to a solution of this character, either for the purpose of blending in appropriate additional ingredients, or supplying added water. The latter, for example, may be introduced after pump 17 has been shut down to flush out the equipment or this may be done prior to mixing operations. For this purpose a liquid line 21, shown labeled for water, is connected to line 19, having a cutoff valve 23. Any desirable liquid may be supplied through it.

A flow control or cutoff valve 25 is provided in line 19, shown as being operable electrically by a solenoid 26. A pneumatic or hydraulically operated piston or equivalent device may be used instead of the solenoid. The purpose of this valve is to effect a ready supply or a clean cutoff of liquid. Thus water may be needed quickly in case of fire or some other emergency. The valve may be arranged also to control the rate of flow if desired.

Below the valve 25 the flow line 19 is branched to provide a main flow line 27, controlled by a valve 29 and a bypass line 31, controlled by a valve 33. A single control device such as handle 35 may be used to operate both valves. A perfferred arrangement is that in linkage so devised, one valve is opened as the other is closed. Both can be completely closed or opened and in this way a convenient and full control of the relative proportions of flow through the two lines is readily achieved. If C pounds of total liquid are desired, the arrangement is such that a combined flow A, through valve 29, and a flow B, through valve 33, equal C. Also, either A or B can be varied from zero to C.

The control handle or lever 35 can be operated manually or by electrical, pneumatic, hydraulic or mechanical means. It may be operated in steps or in smooth continuity and may be controlled by a programmer, not shown, of conventional type, as when it is desired to vary the aeration of the liquid. Thus, at the bottom of a borehole where a fully effective dense explosive is required for maximum blasting power, no aeration may be needed and valve 33 may be completely closed. Midway up the borehole, a less dense explosive of moderately strong character may be needed and valve 33 will be opened partially. Near the top, a light frothy mix may be needed, and valve 33 may be opened wider, or even fully in some cases.

The fluid passing in quantity A through line 27, assuming valve 29 is open to some extent, flows into an annulus or funnel 37 arranged in the upper portion of a mixing chamber 39. In mixing chamber 39 all the ingredients which form the explosive composition are to be mixed and blended together. These may comprise C pounds per minute of liquid and D pounds per minute of solid particulate matter, often called a "premix," to make a total of E pounds of slurry per minute.

A three-way valve of conventional type may be used instead of the two separate valves 29, 33 and their unitary control. That portion B of the stream which passes through valve 33, or through its equivalent in a three-way valve if this line is open, flows to a frothing or gas-liquid blending device comprising chamber 41 and a mixer blade 43 therein driven by a motor 45. Depending on design and capacity of the mixer, as much gas, admitted through line 47, as is desired, may be beaten into the liquid in the form of fine bubbles.

The liquid solution in tank 11 contains preferably a small amount of a thickener or gelling agent such as a fraction of one percent of guar gum or a little larger quantity of precooked starch. By this means the solution is increased in viscosity sufficiently that it will hold at least the very fine gas bubbles against escape or coalescence for a substantial period of time. Air is normally the gas admitted throuhg line 47 but other gases such as carbon dioxide, nitrogen, etc., admitted through line 47 or introduced otherwise, may be used. Preferably the gas used is not unduly adsorbed in the liquid.

From the aerator or mixer 41, the foamy or frothed liquid passes through outlet line 49 into annular funnel 37 where it may be blended with relatively unaerated liquid, if desired, from line 27. The aerated liquid or mixture then passes through the central outlet 51 of funnel 37 into mixer 39.

The mixing unit or chamber 39 includes at least one stirrer 53, to which a supplemental stirrer 55 may be added. These are mounted on mixer shaft 57 operated by drive motor 59. The latter may include a suitable reducing gear of known type, if desired.

The particulate materials, sometimes referred to as "pre-mix," or sometimes part of them are supplemental oxidizer salts, and referred to as "dries," are contained in one or more hoppers 61. Only one is shown here. These particulate solids are dispensed at controllable and variable rates by any suitable dispenser. This is shown here as an auger or screw feeder 63, although other types of feeders may be used, if desired. The rate of feed may be varied and controlled in any suitable way, e.g. by varying the speed of rotation of the worm or auger 63, or by changing the size of the opening by which the particulate materials reach the auger, or leave it, as will be obvious to those skilled in the art. Preferably, control of dispensing rate is by control of the rate of rotation which is made variable, either by use of a variable speed electric motor, or fluid driven motor, or by suitable speed changing drives of known type.

The dispensed particles of dry material, either "premix," "dries," or both, fall through a pipe or flow line 65 into the top of the mixer 39 where they are deflected by the upper wall 67 of annual funnel 37 and fall through its central opening 51 to mix with the liquid. The liquid and solids are stirred together by the stirring devices 53, 55. It will be understood that the stirring device(s) rapidly mixes these materials together so that a good, homogeneous dispersion of undissolved solids in suspending liquid is obtained. The solids suspended, or some of them, may not be absolutely insoluble in the liquid, but may be kept out of solution because the liquid is saturated. This frequently occurs when dry particulate ammonium nitrate, sodium nitrate, etc., are added to a liquid already saturated; some of the particles cannot dissolve and remain in suspension. Others in the "pre-mix," such as fine particles of metallic aluminum, sulfur, powdered coal, ground gilsonite, etc., are insoluble by nature. Still others, such as guar gum, are colloidally dispersible but may not be truly soluble in the liquid. It is important that such particles, whether completely or partially soluble or completely insoluble, remain well suspended and homogeneously dispersed throughout the slurry. The thickening or gelling effect of the viscosity-increasing agent is important for this purpose. This agent may be guar gum or other naturally occurring gums, with or without cross-linking agents, or may consist of or comprise flours, starches, etc., with or without crosslinkers, and combinations of such materials. As noted in the Clay et al. Pat. No. 3,303,738, the suspended particles may remain in suspension in liquids of relatively low viscosity, as long as they are kept agitated. Such liquids are readily pumpable. After they are delivered into the borehole and become quiescent, further thickening is desirable to prevent gravitational segregation of the suspended particles which differ from the suspending liquid in their density. This further thickening can be obtained by choice and timing of introduction of the thickener, or of duration of mixing and delivery time, or a combination of such factors. In warm or hot slurry manufacture, the warm liquid may flow quite freely and be readily pumpable whereas upon cooling, as when the warm slurry contacts cold rock in a borehole (and cold water which may be present also), the resulting precipitation of dissolved oxidizer salt (e.g. ammonium nitrate) from the solution, will appreciably thicken the slurry and may prevent gravitational segregation, even if little or no viscosity increase due to a "thickener" takes place.

The mixed materials, now in slurry form, then flow out through the bottom of the mixing zone through an outlet line 69 to a slurry delivery pump 71. This is shown diagrammatically in simple form in the various figures but is preferably a positive displacement pump so that it may serve as a metering device for dispensing slurry at a controlled rate. In this way the amount of slurry delivered to each receptacle or borehole may be accurately measured and the measurement may be recorded or totalized by suitable recorder means, not shown.

A flow control valve 73 preferably is provided also in the pump outlet line 75. This may be a metering type valve, if desired. In case the valve 73 is closed or is only partly open and the capacity of the pump 71 is greater than the flow of slurry permitted by the valve to the line 74, a bypass line 76, equipped with an adjustable valve 77, is provided. The two valves may be interconnected with common operating means 79 which may be operated either manually or automatically, in the same general manner as control means 35, described above.

Referring now to FIG. 2, there is shown a modification which includes the liquid supply tank 11, but the tank has two outlet lines 80 and 81, controlled respectively by valves 82 and 83. Outlet line 80 goes directly to a pump 85 from which it can be pumped through line 86 to a funnel in the mixing chamber, such as that shown at 37 in FIG. 1. The mixing apparatus 57, shown in FIG. 2, may be identical with that of FIG. 1. The other flow line 81 leads to an aerating chamber 88 in which a stirring and aerating device 89 on a shaft 90 is mounted vertically in bearings 91 beneath the aerating mechanism. The shaft 90 of the aerator or homogenizer 89 is driven by a belt 93 on its pulley 94, from a motor, not shown. This unit may be similar to or identical with that in FIG. 1, or other types may be used. The outlet line 95 from the mixing or frothing chamber 88 passes into the mixing chamber 39. Obviously, by varying the settings of valves 82 and 83, the relative proportions of unfrothed and frothed liquid may be varied in any desired ratio from zero to infinity. If a highly frothy composition is desired, it may be necessary that all or nearly all of the liquid be frothed before it goes into the mixing chamber 39. As a general rule, however, a smaller proportion, typically 10 to 50% or so, will be quite adequate. Controls are not shown for the valves in FIG. 2, but they may be interconnected, if desired, so that by a single control operation flow through lines 80 and 81 may be varied infinitely from 0 to 100%, in either line. Thus the mixture passing through the pump outlet 86 which goes to the blending device, not shown but equivalent to device 39 in FIG. 1, may have any reasonably desired degree of aeration or frothing.

In both these arrangements, the aerating device 43 or 89 is preferably a high speed aerating or homogenizing device. It may be similar to those used in food or drink blenders, such as the "Waring Blender," for example. What is essential is that the aerating device have sufficient energy and vigor of operation to incorporate into the liquid a very large number of very small bubbles in the aerated fluid. The number of bubbles seems to be more important than their size, at least so far as sensitization of the slurry to detonation is concerned. The vessel 88, with the mixer 89, preferably is arranged so that it can be detached from its drive mechanism and from vessel 39, etc.

An air vent tube 98 is provided to bring in the air which is beaten into the liquid by the blender or aerator 89. The blender or aerator blades 89 are driven preferably at high speed. The oxidizer in solution is not explosive per se and there is no danger of explosion as there might be if the slurry as a whole were beaten vigorously.

As is well known in the art, the particulate solids may consist of one or more of various ingredients. In FIG. 2 these are supplied from one or more hoppers 99 by dispensing device 100 into a pipe 101 which leads into the slurry mixing chamber 39.

The particulate solids may comprise finely divided particulate aluminum, with or without other fuels, carbonaceous fuels, etc., such as ground coal, gilsonite, or the like. Particulate self-explosives, such as TNT, smokeless powder, etc., may be used or included, as is known in the art. The solids also may include sulfur in finely divided form and they may include one or more thickening or gel-forming ingredients such as starch, guar gum, or equivalent in addition to thickeners or foam promoters in the liquid solution. Cross-linking materials, to facilitate the thickening action of the gum in solution, particularly, may be included, such as borax, potassium or sodium dichromate, or other known materials of this type.

Thickeners suitable for adding to the liquid, before the solids are introduced in the slurry mixing chamber, may be of several types. A preferred material is one of the galacto-mannan gums such as hydrated guar gums, a desirable material for aerated slurry being the modified guar gum XG492, sold by General Mills in U.S.A. This is understood to be a gum that is essentially free of metal or salt additives, to which hydroxyl groups have been added by some treatment. It promotes aeration of the liquid and is a good stabilizer for the foam produced at the blender. It will be understood that a small amount of such a gum, e.g. 0.01 to 0.2%, in the liquid solution (e.g. tank 11) is sufficient to stabilize this foam. These are weight proportions, based on the total slurry. Additional gum or thickener of the same type or of some other, such as starch, etc., may be included in the dry "pre-mix" of container 61, FIG. 1, etc., when it is desired to increase long storage viscosity, but it often will not be needed when the slurry is to be detonated within a few hours.

Alternatively, certain commercially available foam promoters, particularly those which are effective in strong solutions of oxidizer salts, may be added to the liquid, e.g. in tank 11, in very small proportions, say 0.005 to 0.1% or so. A suitable material to stabilize the foam and "lock" the small gas bubbles in place, while having low wetting properties, is a liquid salt water or brine foamer made and sold by General Aniline and Film Corp., U.S.A., under the designation "CD-128." It is understood to be a linear aliphatic ethoxylate sulfate. Another suitable material is an anionic salt water foam promoter sold by General Aniline under the designation "Gafen FA-7." It is satisfactory in salt containing solutions, in presence of other materials, in similar small proportions. It is understood to be an organic phosphate ester. Under suitable conditions other surfactants, effective in salt containing water, may be used such as "Alipal EO-526" or "CO-436," or "Gatamide CDD-518."

It is important that the foam stabilizer not have strong wetting properties because it is desirable to trap air on the suspended particulates, such as aluminum. Detergents are commonly undesirable, particularly where fine particles of aluminum are present.

The modified guar gum XG-492, mentioned above, is particularly suitable in the small proportions mentioned above. It promotes foaming and apparently has less tendency to syneresis than ordinary gums. It appears to be less susceptible to decay caused by bacteria; it swells in aqueous solutions of high pH and swells also in most organic solvents, particularly those containing hydroxyl group, such as alcohols, glycols, glycol ethers, etc. A very satisfactory way to incorporate such a gum into the concerntrated oxidizer-water solution is to first disperse it in a glycol.

Foamed materials can be blended with unfoamed liquids if desired, by drawing them into a main stream of unaerated liquid through a venturi. After the two liquids are brought together they can be combined with particulate solids to form the desired explosive slurry. Of course the venturi is ineffective if all the liquid is being aerated, but even in this case the system is operable.

The liquid into which the particulate solids are to be mixed, and preferably blended well so as to form a homogeneous slurry, preferably includes at least one bubble retaining or froth stabilizing ingredient. A small amount of gum solution will itself perform this function to some degree, as is indicated in the application of Clay, Ser. No. 488,803, previously mentioned. This ingredient, however, may be a foam promoter, or even a foam generator (i.e. a gas generating composition, e.g. one which produces $CO_2$) or the like by chemical action. The nature of thet hickener itself may be such, as is the case with the foaming gum already mentioned, that it promotes foaming, to a small degree at least, and then physically locks the fine bubbles in place. Such an ingredient may be referred to in the claims below as either a foam stabilizer or as a frothing agent, or both. The mixing zone need not always include a mechanical mixer so long as the liquid and solids are mixed with reasonably high energy while in the mixer or as they flow in. The slurry delivery pump can serve in some cases to complete the mixing and make the slurry at least reasonably smooth, uniform and homogeneous in texture. With appropriate aeration the slurry pump may be used to control density. However, care must be taken not to draw in large masses of big bubbles of air that would cause descontinuities in the slurry.

Figure 6:
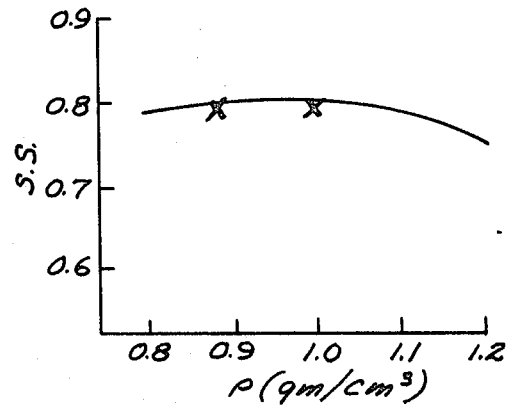

FIGS. 3 and 6 inclusive illustrate graphically some of the results of controlled aeration and deliberate changes in slurry density. FIG. 3, in particular, shows a remarkable increase of detonation velocity D as density of two typical slurries is reduced by aeration. In these particular slurries a maximum detonation velocity was obtained when the original density of about 1.20 grams per cubic centimeter was reduced to around 1.10. Thereafter, further reduction caused a decrease in D. The following data were obtained.

A base mix was made up of an aqueous solution of 15 parts water, 42 parts ammonium nitrate and 15 parts sodium nitrate, with a small amount of foaming type guar and 0.2 part non-foaming gum included. This solution in one case was passed through a pump before adding any dry ingredients. This incorporated a small amount of foam in it. A mixture of fuels (4 parts sulfur and 6 parts gilsonite with a small amount of dry guar gum) and some additional dry ammonium nitrate, 17.7 parts, were then added to make a thick slurry. This lightly aerated composition had a density of 1.16. In a 4-inch column it had a detonation velocity (at 32° C. detonation) of 3320 m./sec. In a 5-inch column, the detonation velocity was 3620 m./sec. See FIG. 3.

Next the non-foaming gum was replaced with the foaming XG-492 type gum; the slurry had a density of 1.08 after the solution went through the pump. Detonation velocities increased to 3520 and 3660 m./sec., respectively for 4 and 5-inch columns. The only aeration was in the solution pump.

Compositions as just described were next treated by passing the liquid solution through a Waring blender of common household type for 15 seconds in addition to putting it through the pump, thereafter blending the solids into the slurry. This slurry had a density of only 1.01 and the detonation velocities were 3150 and 3250 m./sec. respectively.

Finally, the same compositions as in the last two examples were made up without putting the solution through a pump or through the blender at all. Its density was 1.20. Detonation of the 4-inch column apparently was incomplete. The 5-inch column detonated at 38° C. with a velocity D of 3150 m./sec. Even this slurry probably had a small amount of aeration introduced when the solids were mixed in. Its density otherwise would have been a little higher.

Since detonation pressure is proportional to the square of the detonation velocity D, assuming density to be constant, it is desirable to maximize the product $\rho D^2$. A moderate lowering of densities increases this product. However, there are other factors which must be taken into consideration, such as the relationship between sensitivity and density.

Another solution was made up exactly as above, containing 0.3 part of foaming type "XG-492," as mentioned above. The solids comprised about 9% of fuel (gilsonite and sulfur) and about 0.2 part of dry non-foaming guar gum, with minute amounts of some specially selected cross-linking agents, i.e. 0.1 part of sodium dichromate and 0.02 part of tannic acid. Added also was 17.7 parts AN. The solution was passed through a centrifugal solution pump and then the solids were incorporated in it by stirring. Separate samples of the slurry just described were aerated more or less to obtain the densities indicated, without change in composition. The results were as follows:

TABLE I

| G./cm.$^3$ | Col. diameter, inches | Temp., ° C. | Results |
| --- | --- | --- | --- |
| 1.19 | 2 | 33 | Failed 4″. |
|  | 3 | 33 | Detonated. |
| 0.88 | 1½ | 33 | Failed 4″. |
|  | 2 | 33 | Detonated. |
|  | 3 | 33 | Do. |
| 1.02 | 2 | 33 | Failed 2″. |
|  | 3 | 33 | Detonated. |

Figure 4:
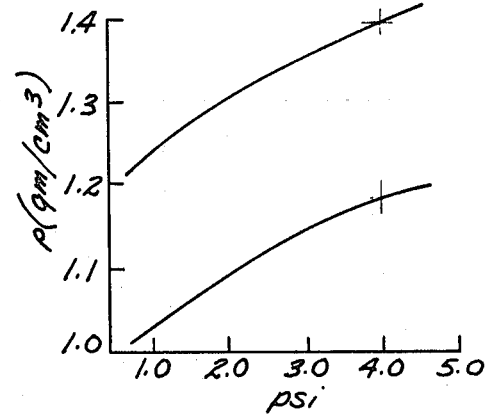

When aerated slurries are placed in long columns in deep boreholes, and particularly when stemming is placed on top of them, the pressure head thus created compresses the gas and increases the slurry density. Under such conditions failure may occur if due allowance is not made for density increase. These failures can be avoided, of course, either by using a more sensitive mix, or by increasing the aeration to compensate for the gas compression. The relations between density and pressure of typical aerated slurries are shown graphically in FIG. 4. Knowing the height of a column and the degree of aeration, these values can readily be calculated for any slurry. The initial aeration figure is seldom correct, however, because most aerated slurries will lose part of their aeration at first.

Also, many slurries include some gas added unintentionally. Until the slurries reach a fairly stable level by standing for a while, simple aeration calculations are likely to be misleading.

Figure 5:
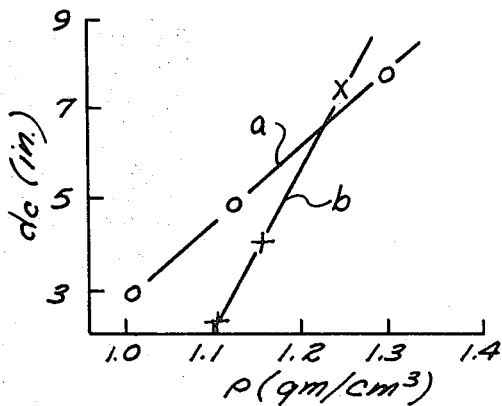

The direct effect of deaeration on sensitivity is shown in FIG. 5 where a slurry which was sensitive to detonation in a 3-inch column (i.e. $d_c=3''$) at density about 1.0 had it critical diameter increased to 7 inches when its density reached 1.3. A slurry made up with fine aluminum as a sensitizer had a critical diameter of 3 inches when its density was reduced, by aeration, to 1.0. At density about 1.14 its critical diameter increased to 5 inches and at 1.3 density the critical diameter was 7 inches. Detonation temperatures were 15° C. in these tests. Another slurry, sensitized with gilsonite and sulfur, with no aluminum, and including a total of nearly 30% of sodium nitrate, partly in solution and part added dry, had a density of 1.10 in aerated condition for a critical diameter of 2 inches. At density 1.17, the critical diameter increased to 4 inches and at 1.26 to 7 inches. The solution, aerated before solids were added, was essentially the same as those above. Detonation temperature for this mix was 20° C. The data, $a$ and $b$, respectively, FIG. 5, show an essentially linear relationship for both of these slurries. They clearly indicate that sensitivity can be quite accurately controlled at will, within fairly wide limits. This control is an important and useful achievement, made possible and practicable by the present invention.

Performance of an explosive usually is best measured ultimately by its seismic strength, assuming it meets practical requirements of sensitivity, velocity of propagation, etc. It will be expected that the optimum ranges of seismic strength with respect to varying density will differ with various explosive compositions. FIG. 6 shows a graph of the same non-aluminum sensitized slurry as line $b$, FIG. 5. Compared to pellotol on a weight basis, seismic strength of this relatively very inexpensive slurry was about 0.80 throughout a fairly wide range of density. This shows how one can vary the density quite widely to meet particular needs of sensitivity, critical diameters, seismic strength, performance at low temperatures, etc., without changing the ingredients of the explosive other than the quantity and type of aeration, frothing or levitation. With this particular slurry a marked decrease in seismic strength was noted at density about 1.24, but from about 0.80 to 1.15 density, the sesmic strength was remarkably high and uniform, considering the nature and cost of the ingredients. The full formulation in this case was as follows:

Solution (parts by weight)—42 AN, 15 SN, 15 H$_2$O, 0.25 Guar, 0.5 EG
Pre-mix—4S, 6 Gil, 2.1 TF, 0.2 Guar
Added oxidizer—15 SN It will be obvious that other variations and combinations may be made, it being important for the purpose of the present invention to note that the liquid, or part of it, can be aerated, when aeration is desired, before it reaches the blending zone where the solids are added thereto. As previously noted, detergents per se are not desirable, especially if present in any notable quantities. In order to accomplish this, it is necessary that the liquid contain one or more ingredients suitable for retaining the aerated structure, at least the more finely divided bubbles, which are important for imparting sensitivity to the mixture. By inclusion in the liquid, prior to adding the normal solids, of a small amount of the thickener, such as 0.01 up to as much as 1% in rare cases, but usually not more than ½%, of guar gum per se, or of lesser amounts of a foaming agent per se, or of gum with a very small amount of foaming agent, the desired results may be obtained.

Slurry aeration of course took place to a variable degree in the prior art, for example, as described in the abandoned application of Cook, Ser. No. 422,034, mentioned above. Some aeration necessarily takes place during any operation of mixing dry particulate solids and the liquid together. The solids occlude the air, or other gas, and assist in bringing it in. In the present case, however, a preaerated liquid is combined with the solids. This is much more satisfactory, making a more stable aerated slurry than is obtained by aeration only at the point of mixing the dries and the liquid together. This type of pre-aeration may be more closly controlled to get the very fine bubble structure which is highly desirable and which imparts the required sensitivity. Sensitization obtained in this way is greatly superior to that obtained by introducing the gas with the solids. It can be better controlled. It minimizes the required quantities of expensive sensitizing agents such as very finely divided paint grade aluminum particles, and the like. Mixing solids into the solution after its aeration breaks up and removes any undersirably large bubbles. This initial and deliberate aeration of the liquid before the solids are added gives better control over sensitization than when one attempts to introduce the desired fine bubble structure into a finished slurry.

They should contain enough liquid to establish a substantially continuous liquid phase, except for aeration, usually about 10 to 25% of the weight of the slurry. By the term aeration is meant the incorporation of 2% or more, up to 80%, by volume, in some cases, of gas in excess of that which normally be included unintentionally, due to occlusion with the solids or to the agitation necessary for adequate blending of the solids into the liquid. A total weight proportion of liquid and inorganic oxidizer salt runs between about 50 and 95% of the slurry, but the salt may or may not be completely dissolved in the liquid, depending on the solution temperature. Ammonium nitrate is preferably included as an oxidizer in proportions of at least 25% by weight of the total slurry.

Guar gum in proportions of 0.01 to 2% by weight is the preferred thickener. It may be specially treated to promote foaming of the liquid but is considered a foaming agent and a foaming stabilizer in either case, with or without such treatment, when it is put in the liquid before the dry particulate fuels, etc., are added. Combinations of guar gum with brine foamers are excellent for both creating the froth and for stabilizing it.

Enough fuel is included to bring the overall oxygen balance to a value between about +15% and −40%, the numerically larger negative value being permissible especially when aluminum is included in such a form as will react with water. The liquid may comprise materials such as glycols, water compatible alcohols, formamide, etc., but it preferably comprises at least 5% or more of water, based on total weight of the slurry.

A preferred composition is a slurry aerated to include at least 2% by volume of intentionally added gas, 10 to 25% of liquid which is at least predominantly water, 25 to 75% by weight of oxidizer salt, part of which is ammonium nitrate, and 5 to 40% of particulate fuel which may consist of one or more of (1) finely divided aluminum, (2) carbonaceous materials such as powdered coal, gilsonite, wood flour, sugar, lignin derivatives, etc., (3) sulfur. The liquid solution may include liquid fuels as mentioned above and it should include enough thickener or gelling agent dissolved or dispersed in it to increase appreciably its viscosity and increase measurably the degree to which fine gas bubbles of aeration are trapped and stabilized therein. While use of a small amount of finely divided aluminum as a fuel component is desirable where maximum blasting power is needed, carbonaceous fuels with or without sulfur and without aluminum may be sufficient in proportions of 5 to 15% or more by weight. The dry particulate ingredients also may include inorganic oxidizer salts aside from those contained in the original liquid solution of oxidizer.

In addition to thickener or gelling agent in the solution, such may be included also in the dry ingredients. However, the use of at least part of the thickener or gelling agent in the solution to promote and stabilize froth therein is an important aspect of this invention. Aeration which, in total, reduces the slurry density only slightly, e.g. as little as 2%, can be very effective to increase sensitivity if the bubbles are very small and very numerous. The slurries of this invention, if produced without deliberate or intentional aeration, have normal densities within the general range of about 1.3 to about 1.9 grams per cubic centimeter, usually between about 1.4 and 1.7. The slurries of this invention, as delivered to a borehole for example, may have densities as low as about 0.8 or as high as about 1.85. In extreme cases either of these limits may be exceeded. For blasting in the presence of water, densities usually will exceed 1.0 so that the slurry will not float on the water. In general, this invention contemplates a density reduction of at least 2% below normal unaerated density.

Quantities of foam promoter may vary rather widely. When guar gum or equivalent galacto-mannan materials are used, the gum incorporated in the solution usually will be between 0.01 and 0.5% by weight of the total composition. Additional gum, or other thickeners such as starch, flour, etc., may be added with the dry particulate material after the liquid has been aerated to some degree. The other foam promoters or stabilizers, especially the salt water foamers, may be used in proportions as low as 0.001% up to 0.25% or so. More may be used in some cases, provided that they are not strongly surfactant or detergent in character or quantity so as to cause undue wetting of the fuel or sensitizer particles. This is particularly important when small quantities of finely divided active metal particles, fine grades of aluminum, for example, are used as sensitizers.

It will be understood that the invention here described has method, composition and apparatus aspects and it is intended by the claims which follow to cover such and all modifications and variations of them which would suggest themselves to those skilled in the art, as broadly as the prior art properly permits.

What is claimed is:

1. The method of preparing and controlling the density of an explosive blasting slurry which comprises adding a foam promoting and viscosity increasing agent to liquid solution, intimately blending at least part of said liquid solution with a gas to produce fine gas bubbles therein, said agent being effective to substantially entrap and retain said fine bubbles, and thereafter mixing the gas-containing liquid with particulate fuel solids which impart sensitivity to the composition and are supported in homogeneous slurry form by the liquid.

2. Method according to claim 1 wherein the foam promoting agent comprises a small amount of gel-forming thickener which tends to stabilize said fine gas bubbles.

3. Method according to claim 1 wherein a stream of said liquid solution is conducted to the point of mixing with the solids and said stream is divided and part only thereof is blended with said gas.

4. Method according to claim 1 wherein a part of the liquid supply is supplied in relatively unaerated condition directly to the point of mixing with the particulate solids while another part is blended with gas separately and thereafter is combined with the unaerated portion before said particulate solids are added.

5. Method according to claim 1 wherein the foam promoting agent comprises a salt water foamer.

6. Method according to claim 1 wherein the foam promoting agent comprises a foam promoting gum.

7. Method according to claim 1 wherein the foam promoting agent comprises 0.01 to 0.5% by weight, based on the total slurry composition, of guar gum and less than 0.3% of another foam promoter.

8. Method according to claim 7 wherein 0.001 to 0.25% of a brine foamer is incorporated in the solution prior to blending in the gas.

9. An aerated explosive composition having a density between about 0.8 and 1.85, which comprises an aerated liquid solution of strong inorganic oxidizer salt selected from at least one of the group consisting of ammonium nitrate, sodium nitrate and the ammonium and alkali metal chlorates and perchlorates, said solution containing a very large number of finely divided gas bubbles stably held in the liquid phase, said bubbles being fixed in said liquid phase by 0.01 to 1.0% by weight, based on the total composition, of thickener and foam promoting and viscosity increasing agent, and 5 to 50% of undissolved particulate solids stably and homogeneously suspended in said aerated solution, said particulate solids including sufficient fuel material to bring the oxygen balance of the composition between +15% and −40%.

10. Composition according to claim 9 which contains at least 25% of ammonium nitrate and at least 10% of liquid comprising water.

11. Composition according to claim 9 wherein the thickener comprises 0.01 to 0.5% of a galacto-manan gum.

12. Composition according to claim 11 wherein the foam promoting agent is a brine foamer.

13. Composition according to claim 11 wherein the foam producing agent is included in the gum.

14. Composition according to claim 9 in which said liquid solution of strong inorganic oxidizer salt is substantially a saturated solution of ammonium nitrate and sodium nitrate and wherein the liquid of the solution and said nitrates comprise 50 to 95% by weight of the total composition, and 10 to 40% of particulate sensitizer-fuel solids stably and homogeneously suspended in said solution, said sensitizer-fuel being selected from at least one of the group which consists of carbonaceous materials, sulfur, and aluminum, said slurry composition having its density deliberately reduced from normal unaerated condition by at least 2%.

15. Method according to claim 1 which includes feeding a plurality of streams of said solution of strong oxidizer salt containing said agent to a mixing zone, incorporating fine gas bubbles in at least one of said streams to cause frothing of said stream, and varying the flow rate in at least one of said streams to change the relative proportions of frothed and unfrothed liquid, thereby to control selectively the density of the final composition.

References Cited
UNITED STATES PATENTS

| | | | |
|---|---|---|---|
| 2,768,072 | 10/1956 | Stark | 149—2X |
| 3,049,454 | 8/1962 | Stark | 149—2 |
| 3,212,944 | 10/1965 | Lyon et al. | 149—46X |
| 3,249,474 | 5/1966 | Clay et al. | 149—44X |
| 3,282,752 | 11/1966 | Clay et al. | 149—44X |
| 3,282,754 | 11/1966 | Gehrig | 149—46X |
| 3,288,658 | 11/1966 | Ferguson et al. | 149—2 |
| 3,288,661 | 11/1966 | Swisstack | 149—2X |
| 3,376,176 | 4/1968 | Gehrig | 149—46 |
| 3,382,117 | 5/1968 | Cook | 149—44X |

CARL D. QUARFORTH, Primary Examiner

S. J. LECHERT, JR., Assistant Examiner

U.S. Cl. X.R.

149—40, 42, 43, 44, 46, 60, 61, 70, 71, 72, 73, 76, 77, 82, 83, 85, 41

UNITED STATES PATENT OFFICE
Certificate

Patent No. 3,582,411                                                      Patented June 1, 1971

Stephen M. Brockbank and Robert B. Clay

Application having been made by Stephen M. Brockbank and Robert B. Clay, the inventors named in the patent above identified, and Ireco Chemicals, Salt Lake City, Utah, a corporation of Utah, the assignee, for the issuance of a certificate under the provisions of Title 35, Section 256, of the United States Code, adding the name of Harvey A. Jessop as a joint inventor, and a showing and proof of facts satisfying the requirements of the said section having been submitted, it is this 5th day of June 1973, certified that the name of the said Harvey A. Jessop is hereby added to the said patent as a joint inventor with the said Stephen M. Brockbank and Robert B. Clay.

FRED W. SHERLING
*Associate Solicitor.*